(12) United States Patent
Matsumoto et al.

(10) Patent No.: US 8,004,192 B2
(45) Date of Patent: Aug. 23, 2011

(54) BLACK PASTE AND PLASMA DISPLAY PANEL AND METHOD FOR PREPARATION THEREOF

(75) Inventors: Masahiro Matsumoto, Kyoto (JP); Nobuo Matsumura, Kusatsu (JP); Junji Mata, Otsu (JP); Yuichiro Iguchi, Otsu (JP)

(73) Assignee: Panasonic Corporation, Osaka (JP)

( * ) Notice: Subject to any disclaimer, the term of this patent is extended or adjusted under 35 U.S.C. 154(b) by 286 days.

(21) Appl. No.: 11/932,208

(22) Filed: Oct. 31, 2007

(65) Prior Publication Data

US 2008/0113201 A1    May 15, 2008

Related U.S. Application Data

(62) Division of application No. 10/494,580, filed as application No. PCT/JP01/09761 on Nov. 8, 2001, now abandoned.

(51) Int. Cl.
*H01J 17/49* (2006.01)

(52) U.S. Cl. ........................................ 313/584

(58) Field of Classification Search .................. 313/584
See application file for complete search history.

(56) References Cited

U.S. PATENT DOCUMENTS

| | | | |
|---|---|---|---|
| 4,692,662 A | 9/1987 | Wada et al. | |
| 4,741,963 A * | 5/1988 | Wada et al. | 428/428 |
| 5,352,478 A | 10/1994 | Miyake et al. | |
| 5,851,732 A * | 12/1998 | Kanda et al. | 430/321 |
| 6,084,349 A | 7/2000 | Ueoka et al. | |
| 6,555,594 B1 * | 4/2003 | Fukushima et al. | 522/81 |
| 6,864,630 B2 * | 3/2005 | Fujiwara | 313/584 |
| 6,926,574 B2 * | 8/2005 | Fujiwara | 445/24 |
| 7,011,931 B2 * | 3/2006 | Hatori et al. | 430/320 |
| 7,214,466 B1 * | 5/2007 | Yang et al. | 430/198 |
| 7,358,672 B2 * | 4/2008 | Adachi et al. | 313/587 |
| 7,569,165 B2 * | 8/2009 | Barker et al. | 252/518.1 |
| 7,578,718 B2 * | 8/2009 | Shim et al. | 445/24 |
| 7,678,296 B2 * | 3/2010 | Lee et al. | 252/514 |
| 2002/0182522 A1 | 12/2002 | Sabnis et al. | |
| 2006/0204900 A1 * | 9/2006 | Park | 313/485 |

FOREIGN PATENT DOCUMENTS

| | | |
|---|---|---|
| JP | 01258303 | 10/1989 |
| JP | 05002913 | 1/1993 |
| JP | 8287834 | 11/1996 |
| JP | 10182185 | 7/1998 |
| JP | 10333322 | 12/1998 |
| JP | 11016500 | 1/1999 |
| JP | 2000048645 | 2/2000 |
| JP | 2001084833 | 3/2001 |

* cited by examiner

*Primary Examiner* — Peter Macchiarolo

(74) *Attorney, Agent, or Firm* — Hamre, Schumann, Mueller & Larson, P.C.

(57) ABSTRACT

A black paste contains an organic component and an inorganic powder containing a glass powder and a cobalt oxide. A plasma display panel having a black layer made from the black paste, and methods for fabricating the black paste, the plasma display are also provided.

3 Claims, 2 Drawing Sheets

BLACK PASTE AND PLASMA DISPLAY PANEL AND METHOD FOR PREPARATION THEREOF

CROSS REFERENCE TO RELATED APPLICATIONS

This is a divisional application of U.S. application Ser. No. 10/494,580, filed May 6, 2004, which is a 371 of PCT/JP01/09761, filed Nov. 8, 2001. The disclosure of each of the prior applications is considered part of and is incorporated by reference in the disclosure of this application.

TECHNICAL FIELD

The present invention relates to black pastes, plasma display panels, and fabrication methods thereof. In particular, the present invention relates to a black paste which is suitable for use in a front panel of a display, such as a plasma display, and capable of forming a black layer. The black layer can prevent electrodes and other associated components of a front panel from reflecting external light and increase the display contrast. The present invention also relates to a plasma display panel having a high display contrast, and methods for making the black paste and the plasma display panel.

BACKGROUND ART

A typical plasma display panel (PDP) includes a front panel and a rear panel, which oppose each other with a predetermined distance therebetween, and barrier ribs disposed between the front and rear panels. The barrier ribs, the front panel, and the rear panel define a plurality of cells, each of which functions as a display element. In a cell, two electrodes disposed on an inner surface of the panel are separated from each other with a dielectric layer therebetween. Application of an AC voltage between the two electrodes induces a discharge, which leads to light-emission from a phosphor screen disposed on the surfaces of the barrier ribs. The emitted light passes through the transparent panel, and images are thereby displayed.

In PDPs, the resolution and brightness of images depend upon the width of the electrodes, the pitch of interconnecting conductors, the transparency of the dielectric layers, and the like. Electrode patterns and interconnecting conductor patterns can be formed by screen printing.

Photolithography is also available as a method for forming finer patterns. In photolithography, photosensitive paste, i.e., conductive paste having photosensitivity, applied on the entire surface of a substrate is exposed through a predetermined mask and developed to form a pattern, and the pattern is burned to prepare a high-definition conductor pattern. These methods use photosensitive pastes containing conductive powder and photosensitive resin binders.

It is essential to decrease the reflection of external light at the electrodes disposed on the front panel in order to improve the display contrast. The reflection of external light can be most efficiently decreased by forming a low-transmittance and low-reflectance black layer on a front-panel-opposing surface of a high-reflectance metal electrode so that the electrode will appear black when viewed from the front panel of the display.

FIG. 1 shows an example structure of display electrodes disposed on a front panel of a plasma display. A black layer 10 for preventing the reflection of external light and increasing the display contrast is formed on each transparent display electrode 1 (composed of ITO or the like) for plasma discharge. Bus electrodes 7 (metal electrodes such as silver electrodes) are formed on the black layers 10 to decrease the resistance of the electrodes. The black layer is composed of a material having a high degree of blackness and conductive properties, e.g., ruthenium oxide disclosed in Japanese Unexamined Patent Application Publication No. 10-255670.

Although ruthenium oxide is an excellent material having both a high degree of blackness and conductive properties, ruthenium has a drawback in that it is expensive and has a metallic luster.

An object of the present invention is to provide a black paste for forming a black layer that exhibits a high contrast without using expensive ruthenium and a plasma display panel having the black layer. In the present invention, a material having a desired degree of blackness and a material having desired conductive properties are combined so that a black layer having a high degree of blackness can be obtained at low cost.

DISCLOSURE OF THE INVENTION

To achieve this object, a first aspect of the present invention provides a black paste containing an inorganic powder and an organic component, the inorganic powder containing a glass powder and a cobalt oxide.

A second aspect of the present invention provides a plasma display panel including a front panel and a rear panel, the front panel including a black layer and a first metal electrode, the rear panel including a second electrode, in which the black layer contains a cobalt oxide and a glass component.

A third aspect of the present invention provides a method for fabricating a plasma display panel including a front panel and a rear panel, the front panel including a black layer and a first metal electrode, the rear panel including a second electrode. The method includes a step of forming the black layer with a photosensitive paste containing 10 to 70 percent by weight of a cobalt oxide relative to the total content of an inorganic powder.

Mark 1 is a transparent electrode; and Mark 2 is an address electrode 2; and Mark 3 is a protective layer; and Mark 4 is a barrier rib; and Mark 5 is a front glass substrate; and Mark 6 is a rear glass substrate; and Mark 7 is a bus electrode; and Mark 8 is a transparent dielectric layer; and Mark 9 is a white dielectric layer; and MARK 10 is a black layer; and Mark 11 is a phosphor layer (R); and Mark 12 is a phosphor layer (B); and Mark 13 is a phosphor layer (G).

BEST MODE FOR CARRYING OUT THE INVENTION

Figure 1:
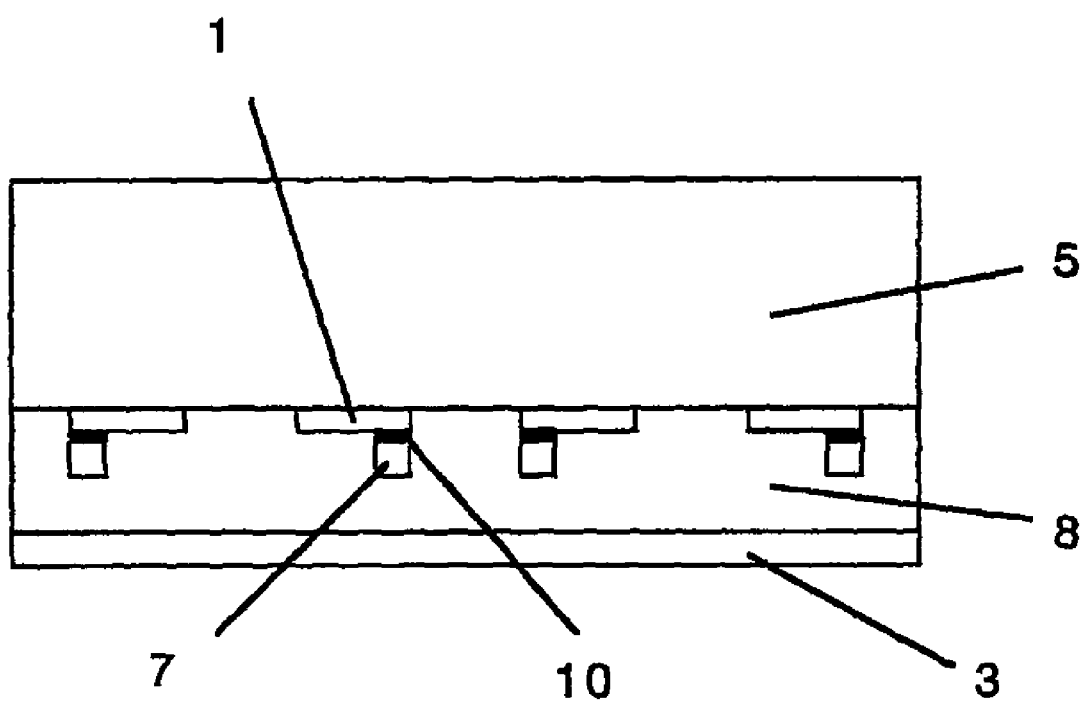
FIG. 1 shows a front panel of a plasma display panel according to an embodiment of the present invention.
Figure 2:
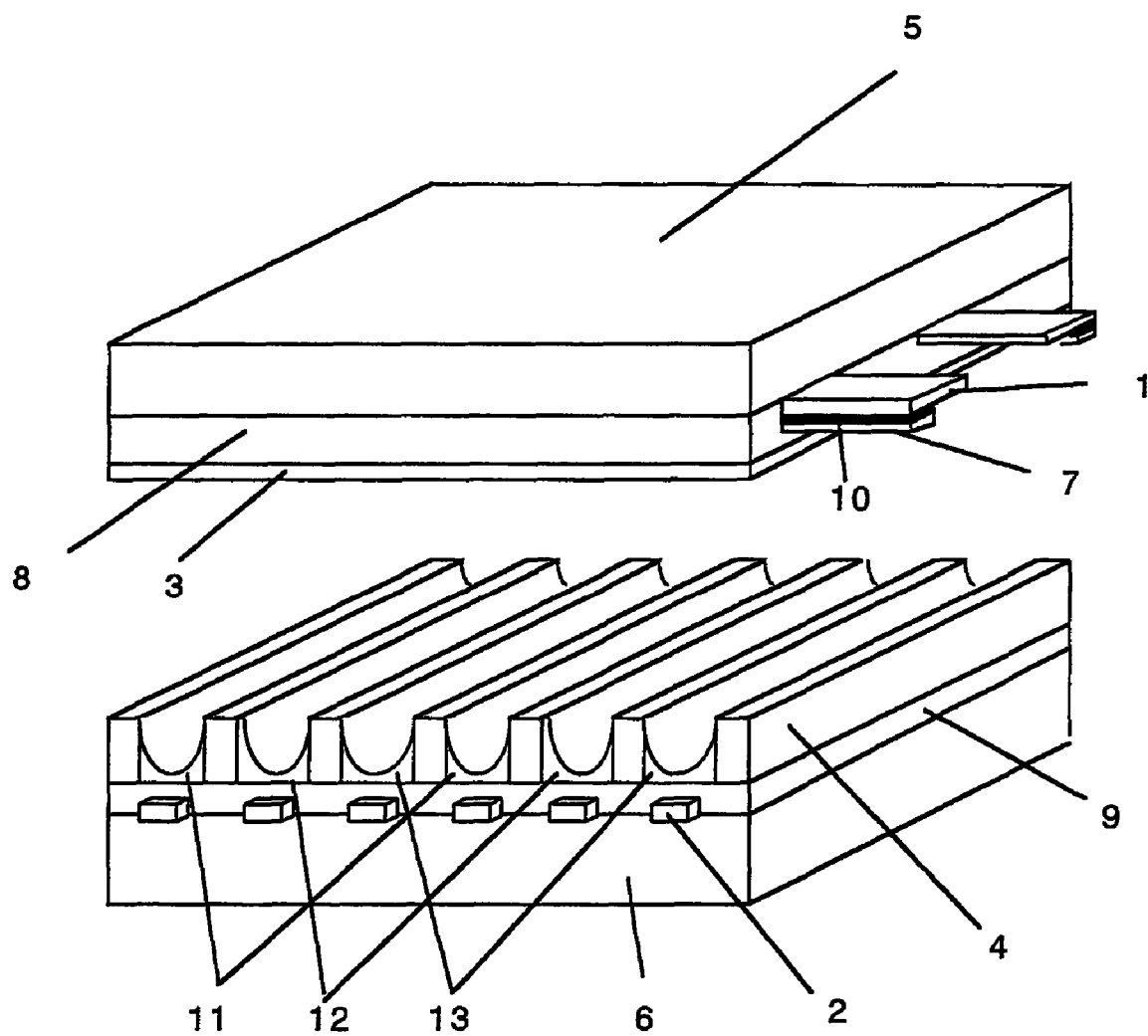
FIG. 2 is a partial schematic view of a plasma display panel according to an embodiment of the present invention.

The preferred embodiments of the present invention will now be described with reference to the drawings. FIG. 2 shows an AC plasma display panel according to an embodiment of the present invention. A front panel includes a front glass substrate 5, a transparent electrode 1 on the front glass substrate 5, a black layer 10 on the transparent electrode 1, a bus electrode (metal electrode) 7 on the black layer 10, a transparent dielectric layer 8 covering these components, and a protective layer 3 on the transparent dielectric layer 8. The transparent electrode 1 is not an essential component of the present invention.

A rear panel includes a rear glass substrate 6, address electrodes 2 on the rear glass substrate 6, a white dielectric layer 9 disposed over the rear glass substrate 6, barrier ribs 4, red (R) phosphor layers 11, green (G) phosphor layers 12, and blue (B) phosphor layers 13. The white dielectric layer 9 reflects light emitted from the phosphor layers 11 to 13. The front panel is bonded with the rear panel to seal a discharge gas inside the space defined by the front panel and the rear panel.

A method for fabricating this plasma display panel will now be described. First, the transparent electrode 1 composed of ITO or $SnO_2$ having a thickness of about 0.12 µm is formed on the front glass substrate 5. For example, the transparent electrode 1 is formed by depositing a starting material on the entire surface of the front glass substrate 5 by ion sputtering or ion plating and then subjecting the deposited layer to photolithography using a photoresist.

Next, a black layer 10 is formed on the transparent electrode 1. The black layer is composed of a black inorganic pigment and a glass component. The term "black" here refers to a dark color that is visually significantly distinct from the background and is not limited to total black. Preferably, the black layer has a high degree of blackness in order to yield satisfactory light-transmittance and reflectance.

The black layer 10 may be formed by pattern-printing using a screen mask but is preferably formed by using a photosensitive black paste so that a fine pattern is obtained. The black paste is composed of inorganic powder containing an inorganic pigment and glass powder. When the black paste is applied on a glass substrate and burned, almost all the organic component contained therein evaporates as a result of combustion. Accordingly, a black layer composed of the inorganic powder contained in the black paste is made. The inorganic powder must contain both a black inorganic pigment and glass powder having a low softening point since the glass powder softens during burning and functions as a binder.

The inorganic pigment used in the present invention is composed of a metal oxide. Examples of the metal oxide include oxides of iron, copper, manganese, cobalt, and compound oxides thereof. Cobalt oxides, which retain the color when mixed with glass and burned, are particularly preferred. In the present invention, the inorganic pigment must contain a cobalt oxide.

Examples of cobalt oxides include but not limited to cobalt (II) oxide (CoO), cobalt(III) oxide ($Co_2O_3(H_2O)$), and cobalt (II, III) oxide ($Co_3O_4$). These oxides are basically black. Cobalt(II) oxide is known to transform into cobalt(II, III) when burned in air at 390 to 900° C. Cobalt(III) oxide is known to transform into cobalt(II, III) when burned in vacuum at 150° C. Thus, cobalt(II, III) oxide is preferred since this oxide retains the color despite the burning process of the present invention.

Whereas cobalt(II) oxide shows various colors depending on the particle diameter and cobalt(III) is brownish black, cobalt(II, III) oxide is gray or black, and is achromatic. In order to improve the contrast of the display and display quality, the black layer is preferably achromatic. Thus, cobalt(II, III) oxide is particularly preferred.

The average particle diameter of the cobalt oxides is preferably in the range of 10 to 100 nm. Particles having an average diameter of less than 10 nm cannot readily be dispersed in the paste and are thus not practical. Particles having an average diameter exceeding 100 nm cause scattering of light and thus may decrease the degree of blackness.

The cobalt oxide content in the paste is preferably 10 to 70 percent by weight of the total content of the inorganic powder, and the cobalt oxide content in the black layer formed therefrom is preferably 10 to 70%. A black layer having a thickness of about 1 to about 2 µm may not have a sufficient degree of blackness when the cobalt oxide content in the inorganic powder of the paste or the cobalt oxide content in the black layer are less than 10 percent by weight. At a cobalt oxide content exceeding 70 percent by weight, the sinterability may decrease. Preferably, the cobalt oxide content is in the range of 15 to 65% by weight.

The black paste applied on the glass substrate is preferably burned at a temperature less than 600° C. in order to reduce deformation of the glass substrate. Since inorganic pigments do not sinter at a temperature less than 600° C., the softening point of the glass powder is preferably 400 to 520° C. to yield a sinter. Glass powder having a softening point less than 400° C. is not preferred since such glass powder starts softening before decomposition and evaporation of a binder resin in preparing the black layer and thus hinders binder extraction. Glass powder having a softening point exceeding 520° C. may degrade the sinterability; thus, a sufficient amount of inorganic compound cannot be added.

Glass powder having a softening point within the above-described range can be used without any particular limitations. The glass powder is preferably borosilicate glass containing lead or bismuth since such glass does not react with the electrodes. Due to increasing regulations on use of lead, glass containing bismuth oxide as the main component is more preferred. The average particle diameter of the glass powder is preferably 0.5 to 5 µm. Glass powder having an average particle diameter of less than 0.5 µm cannot readily be dispersed, and glass powder having an average particle diameter exceeding 5 µm may degrade the flatness and the shape of the electrodes. More preferably, the average particle diameter is in the range of 1 to 4 µm.

In order to improve the conduction between the transparent electrode 1 and the bus electrode 7, the black layer preferably contains a conductive powder. Examples of the conductive powder include metal powder and metal oxide powder. Metal powder of gold, silver, copper, nickel, and the like commonly used as the electrode material may be used without any particular limitations. Nickel metal powder is particularly preferred since it is an inexpensive good conductor.

Preferable examples of the metal oxide powder include, but not limited to, tin oxides and indium tin oxide (ITO). Metal oxide powder may be doped with a trace amount of a dopant to improve the conductivity. For example, doping tin oxide with few percent of phosphorus or antimony will increase the conductivity.

The average particle diameter of the conductive powder is preferably 0.1 to 5 µm. Conductive powder having an average particle diameter of less than 0.1 µm cannot readily be dispersed in the black paste, and conductive powder having an average particle diameter exceeding 5 µm may degrade the flatness of the electrode and deform the shape of the electrode pattern. More preferably, the average particle diameter is 0.5 to 4 µm.

The content of the conductive powder in the black paste is preferably 1 to 60 percent by weight relative to the total content of the inorganic powder. The content of the conductive powder in the black layer formed therefrom is preferably 1 to 60 percent by weight. At content less than 1 percent by weight, a sufficient conductive property cannot be yielded. At a content exceeding 60 percent by weight, the sinterability may be degraded when 10 percent by weight or more of cobalt oxide is added to achieve a target degree of blackness. More preferably, the conductive powder content is 1 to 50 percent by weight.

The total content of the cobalt oxide and the conductive powder in the black paste is preferably 70 percent by weight or less relative to the total content of the inorganic powder. The total content of the cobalt oxide and the conductive powder in the black layer formed therefrom is preferably 70 percent by weight or less. At a total content exceeding 70 percent by weight, the sinterability may be degraded. The cobalt oxide controls the degree of blackness while the conductive powder controls the conductive property. More preferably, the total content is 60 percent by weight or less.

The resin component in the black paste of the present invention is preferably acrylic resin and more preferably photocurable acrylic resin. Resin made from an alkali-soluble acrylic copolymer, a multifunctional acrylic monomer, a photoradical generator, and a solvent is widely used as the photocurable acrylic resin. Since the polymer is alkali-soluble, an alkali aqueous solution can be used as the developer instead of an organic solvent hazardous to the environment. A dispersing agent, a plasticizer, a stabilizer, a polymerization inhibitor, or the like may also be contained in the resin, if necessary.

The acrylic copolymer here means a copolymer containing at least an acrylic monomer as a comonomer. Specific examples of the acrylic monomer include acrylic monomers such as methyl acrylate, ethyl acrylate, n-propyl acrylate, isopropyl acrylate, n-butyl acrylate, sec-butyl acrylate, isobutyl acrylate, tert-butyl acrylate, n-pentyl acrylate, allyl acrylate, benzyl acrylate, butoxyethyl acrylate, butoxytriethylene glycol acrylate, cyclohexyl acrylate, dicyclopentanyl acrylate, dicyclopentenyl acrylate, 2-ethylhexyl acrylate, glycerol acrylate, glycidyl acrylate, heptadecafluorodecyl acrylate, 2-hydroxyethyl acrylate, isobornyl acrylate, 2-hydroxypropyl acrylate, isodecyl acrylate, isooctyl acrylate, lauryl acrylate, 2-methoxyethyl acrylate, methoxyethylene glycol acrylate, methoxydiethylene glycol acrylate, octafluoropentyl acrylate, phenoxyethyl acrylate, stearyl acrylate, trifluoroethyl acrylate, acrylamide, aminoethyl acrylate, phenyl acrylate, phenoxyethyl acrylate, 1-naphthyl acrylate, 2-naphthyl acrylate, thiophenol acrylate, and benzylmercaptan acrylate, and methacrylates of these acrylates. In addition to the acrylic monomer, any compound having a carbon-carbon double bond may be contained as another comonomer. Preferable examples thereof include styrenes such as styrene, p-methylstyrene, o-methylstyrene, m-methylstyrene, α-methylstyrene, chloromethylstyrene, and hydroxymethylstyrene; γ-methacryloxypropyltrimethoxysilane; and 1-vinyl-2-pyrrolidone. The acrylic copolymer preferably contains alkyl acrylate or alkyl methacrylate, and more preferably methyl methacrylate to yield a good pyrolytic property. An unsaturated acid, such as unsaturated carboxylic acid, may be added as the monomer so that the acrylic copolymer becomes alkali-soluble. Specific examples of the unsaturated acid include acrylic acid, methacrylic acid, itaconic acid, crotonic acid, maleic acid, fumaric acid, vinyl acetate, and acid anhydrides of these. The acid value of the polymer after the addition is preferably in the range of 50 to 140 to yield sufficient development properties.

At least part of the polymer preferably has a carbon-carbon double bond at an end of a molecule and/or a side chain in order to increase the curing rate. Examples of the groups having carbon-carbon double bonds include vinyl, allyl, acryl, and methacryl groups. Such a functional group can be added to the polymer by addition polymerization of a compound having a carbon-carbon double bond with the glycidyl or isocyanate group, acrylic chloride, methacrylic chloride, or allyl chloride with the mercapto, amino, hydroxyl, or carboxyl group in the polymer.

Examples of the compound having the carbon-carbon double bond with the glycidyl group include glycidyl methacrylate, glycidyl acrylate, allyl glycidyl ether, glycidyl ethyl acrylate, crotonyl glycidyl ether, glycidyl crotonate, and glycidyl isocrotonate. Examples of the compound having the carbon-carbon double bond with the isocyanate group include acryloyl isocyanate, methacryloyl isocyanate, acryloylethyl isocyanate, and methacryloyl ethyl isocyanate.

A compound having at least two carbon-carbon double bonds per molecule is used as the multifunctional monomer. Examples of such a compound include allylated cyclohexyl diacrylate, 1,4-butanediol diacrylate, 1,3-butylene glycol diacrylate, ethylene glycol diacrylate, diethylene glycol diacrylate, triethylene glycol diacrylate, polyethylene glycol diacrylate, dipentaerythritol hexaacrylate, dipentaerythritol monohydroxy pentaacrylate, ditrimethylol propane tetraacrylate, glycerol diacrylate, methoxyated cyclohexyl diacrylate, neopentyl glycol diacrylate, propylene glycol diacrylate, polypropylene glycol diacrylate, triglycerol diacrylate, trimethylol propane triacrylate, bisphenol A diacrylate, diacrylate of a bisphenol A-ethylene oxide adduct, diacrylate of a bisphenol A-propylene oxide adduct, and compounds derived from the these compounds by replacing all or part of the acryl groups with methacryl groups.

A commercially available photoradical initiator can be suitably used as the photopolymerization initiator. Examples thereof include, but not limited to, 2-benzyl-2-dimethylamino-1-(4-morpholinophenyl)-butanone-1, bis(2,4,6-trimethylbenzoyl)-phenylphosphine oxide, 2-methyl-1[4-(methylthio)phenyl]-2-morpholinopropan-1-on, and 2,4-diethylthioxanthone.

Examples of the preferable solvent include, diethylene glycol monoethyl ether acetate, diethylene glycol monobutyl ether, diethylene glycol monobutyl ether acetate, 2-methyl-2,4-pentanediol, 3-methyl-1,5-pentanediol, 2-ethyl-1,3-hexanediol, terpineol, 3-methyl-3-methoxybutanol, γ-butyrolactone, texanol, benzyl alcohol, dipropylene glycol monoethyl ether, tripropylene glycol monomethyl ether, and propylene glycol monomethyl ether acetate.

A cationic, anionic, or nonionic surfactant may be suitably used as the dispersing agent. Dimethyl phthalate, diethyl phthalate, or dibutyl phthalate may be suitably used as the plasticizer.

1,2,3-Benzotriazol or the like may be used as the stabilizer.

The transmittance of the black layer of the plasma display panel of the present invention is preferably 2% or less. The interfacial reflectance between the glass substrate and the black layer measured from the front glass substrate is preferably 20 or less, and more preferably 10 or less in terms of L value (luminance of reflection). When the L value is larger than 30, reflection of external light when viewed from the front glass substrate increases, thereby decreasing the display contrast of the plasma display panel, which is not desirable. When the luminance of reflection is excessively low and the transmittance is larger than 2%, a light ray that has passes through the black layer is reflected at the interface between the black layer and the metal electrode. Since the reflectance of the metal electrode is generally markedly large, the reflection of external light increases and the display contrast of the plasma display panel thus decreases, which is undesirable.

The method of preparing the black paste is not particularly limited. For example, a solvent, an acrylic copolymer, and an organic component, such as a photopolymerization initiator, are heated in a stirring mixer to prepare a solution, and glass powder, an inorganic pigment, and the like are added to the solution using a mixer such as planetary mixer. The resulting mixture is kneaded with a three-roller mill or the like, followed by filtering and degassing, if necessary. It is preferable to prepare slurry of the inorganic pigment and a solvent containing a dispersing agent using a disperser, such as a bead mill, prior to the kneading with the three-roller mill so that the inorganic pigment, which tends to undergo cohesion, can be adequately dispersed.

The black paste may be applied by any method but preferably by screen printing. Screen printing is suitable for forming a layer of several to several tens micrometers in thickness. In general, the applied paste is dried by heating at 70° C. to 120° C. for several minutes to one hour. This process is repeated until the thickness of the film reaches a target value. A non-photosensitive black paste is applied by printing predetermined pattern, and a photosensitive black paste is applied by printing on entire surface of a substrate.

The bus electrode 7 is preferably formed of a photosensitive silver paste. The electrode is formed by applying and drying the photosensitive silver paste on the dried black paste, as described above.

Exposure of the applied and dried black paste and photosensitive silver paste is done through a mask having a predetermined pattern. The exposure is carried out with a high pressure mercury vapor lamp with an exposure of, for example, 10 to 500 mJ/cm$^2$ with an i-line wavelength (365 nm).

Upon completion of exposure, the black paste and the photosensitive silver paste, which are unexposed photosensitive areas, are removed using an alkali aqueous solution as a developer, followed by washing with water to obtain a target pattern. Examples of the alkali aqueous solution include 0.05-1 wt. % aqueous solutions of sodium carbonate, monoethanolamine, diethanolamine, and triethanolamine. The development and the washing may be carried out by immersion or with sprays, paddles, or the like. Spray development is particularly preferred since it can produce a pattern having a higher resolution. The time for spraying the developer in the spray development is 20 to 200 seconds. Washing is also carried out by spraying for 10 to 60 seconds.

The resulting pattern is burned in an electric furnace, a belt furnace, or the like. When burned, the organic component evaporates and the inorganic powder becomes sintered to form the black layers 10 and the bus electrodes 7. The burning is preferably performed in air or in a nitrogen atmosphere at 400° C. to 600° C. for 1 to 60 minutes.

The photosensitive black paste and the photosensitive silver paste are preferably exposed and developed at the same time to increase the efficiency. Alternatively, the pastes may be exposed and developed separately.

Next, a dielectric paste containing lead oxide glass powder or bismuth oxide glass powder is applied to form a transparent dielectric layer 8. The applied dielectric paste is burned at 550 to 600° C. to form a layer having a thickness of about 10 to about 30 μm. The dielectric layer 8 may have a single-layer structure or a double-layer structure of glasses having different softening points, as disclosed in Japanese Examined Patent Application Publication No. 9-50769.

Next, a protective layer 3 composed of MgO is formed by chemical vapor deposition (CVD) to a thickness of about 1.0 μm.

The address electrodes 2 are formed on the rear glass substrate 6 of the rear panel by burning a pattern prepared by photolithography using a photosensitive silver paste.

A dielectric paste containing titanium oxide is then applied thereon and is burned to form a white dielectric layer 9.

The barrier ribs 4 are formed by burning a pattern prepared by photolithography using a photosensitive barrier rib paste.

Next, three phosphor pastes respectively containing red, green, and blue phosphor powders are applied in corresponding predetermined spaces defined by the barrier ribs 4. The applied pastes are dried and burned to prepare phosphor layers R11, G12, and B13.

The front panel is bonded with the rear panel using a glass sealing paste. The discharge spaces defined by the front panel, the rear panel, and the barrier ribs 4 are evacuated to high vacuum (approximately 8×10$^{-7}$ Torr). Subsequently, a discharge gas, such as a Ne—Xe gas, is sealed inside the spaces at a predetermined pressure (approximately 500 to 760 Torr) to obtain a plasma display panel.

A high definition plasma display panel having a high display contrast can be made using the black layer and by the plasma display fabrication method of the present invention.

EXAMPLES

The present invention will now be described by way of nonlimiting examples. Note that all the processes described below were carried out under yellow light.

1. Preparation of Photosensitive Black Paste (1): Organic components, i.e., 20 parts by weight of acrylic copolymer (a glycidylmethacrylate-modified methacrylic acid/methyl methacrylate copolymer, acid value: 100, weight-average molecular weight: 30,000), 10 parts by weight of a multifunctional monomer (propylene oxide-modified trimethylolpropane triacrylate), 1.5 parts by weight of a photopolymerization initiator (2-benzyl-2-dimethylamino-1-(4-morpholinophenyl)-butanone-1), 45 parts by weight of a solvent (diethylene glycol monobutyl ether acetate), 1 part by weight of a dispersing agent (Solsperse 20000), and 1 part by weight of a plasticizer (di-n-butyl phthalate), were mixed while heating at 60° C. using a motor and a stirring blade to prepare a solution.

(2): The resulting solution of the organic components was preliminarily mixed and kneaded with the following inorganic powders in a planetary mixer:

A. Glass Powder glass powder 1: softening point: 460° C.; average particle diameter: 2 μm glass powder 2: softening point: 490° C.; average particle diameter: 1 μm glass powder 3: softening point: 500° C.; average particle diameter: 2 μm glass powder 4: softening point: 390° C.; average particle diameter: 2 μm glass powder 5: softening point: 530° C.; average particle diameter: 2 μm glass powder 6: softening point: 460° C.; average particle diameter: 0.3 μm glass powder 7: softening point: 460° C.; average particle diameter: 5 μm, each composed of bismuth oxide ($Bi_2O_3$), silicon oxide ($SiO_2$), boron oxide ($B_2O_3$), and zinc oxide (ZnO)

B. Inorganic Pigment cobalt oxide 1 ($Co_3O_4$), average particle diameter: 70 nm cobalt oxide 2 ($Co_3O_4$), average particle diameter: 100 nm cobalt oxide 3 (CoO), average particle diameter: 50 nm carbon black, average particle diameter: 30 nm C. Conductive Powder
  nickel powder 1, average particle diameter: 2 μm
  nickel powder 2, average particle diameter: 0.05 μm
  nickel powder 3, average particle diameter: 5 μm
  silver powder, average particle diameter: 2 μm
  ITO powder, average particle diameter: 3 μm
  tin oxide powder, average particle diameter: 1 μm (phosphorous-doped)
  tin oxide powder, average particle diameter: 1 μm (antimony-doped)

The average particle diameter of each powder was the value of D50 (the average particle diameter at 50% of powder passing through) measured with a laser diffraction scattering particle size analyzer (Microtrac HRA).

(3) The resulting preliminary kneaded mixture was kneaded with a three-roller mill to prepare a photosensitive black paste.

2. Pattern Forming (1) The photosensitive black paste was applied by screen printing (screen: PET #420) on the entire surface of the front glass substrate having the transparent electrodes (ITO) thereon. The applied paste was dried at 85° C. for 10 minutes. The thickness after drying was 2.5 μm.

(2) The photosensitive silver paste was applied on the black paste layer by screen printing (screen: PET #350) and was dried at 85° C. for 40 minutes. The total thickness of the black paste layer and the silver paste layer after drying was 10 μm.

(3) The black paste layer and the silver paste layer were exposed through a pattern mask using a high pressure mercury vapor lamp with an exposure of 300 mJ/cm$^2$. The pattern mask was of a negative type.

(4) Upon completion of the exposure, the substrate was developed by spraying an alkali developer (0.4 wt. % sodium carbonate aqueous solution), and then rinsed using a water shower.

(5) The resulting pattern was placed in an electric furnace, and the burning was carried out by heating at a rate of room temperature to 580° C. in two hours in the atmosphere and maintaining a temperature at 580° C. for 20 minutes, and naturally cooling. The total thickness of the black layer and the silver electrodes after burning was 5 μm (thickness of the black layer: 1.5 μm).

The above-described process was carried out by changing the inorganic pigment content, the glass powder content, and the conductive powder content in the photosensitive black paste for forming the black layer as in Tables 1 and 2. The results are also shown in Tables 1 and 2. The degree of blackness was determined by a calorimeter (specular component excluded). Layers having an L value (luminance of reflection) of 10 or less are indicated by A (Excellent), those having an L value of 11 to 20 are indicated by B (good), those having an L value of 21 to 30 are indicated by C (fair), and those having an L value 31 or more are indicated by D (poor). The conductive property was determined using a tester. Layers having a resistance of 10 mΩ or less are indicated by A (Excellent), those having a resistance exceeding 10 mΩ are indicated by B (good), and those having no conductive property are indicated by D (poor). The screen printability of each paste was evaluated. That is, the ease of printing was evaluated according to the scale, A (Excellent)>B (good)>C (fair) >D (poor). Regarding the pattern formability, patterns having a line edge roughness and a top surface roughness of 5 μm or less are indicated by A (Excellent), those having a line edge roughness and a top surface roughness of 6 to 10 μm are indicated by B (good), and those having a line edge roughness and a top surface roughness of 11 μm or more are indicated by C (fair). Regarding the sinterability of the black layer, layers sufficiently sintered are indicated by A (Excellent), and those insufficiently sintered or having a relatively large binder content are indicated by C (fair). The results are shown in Tables 1 and 2.

TABLE 1

(parts by weight)

| | | *EX. 1 | EX. 2 | EX. 3 | EX. 4 | EX. 5 | EX. 6 | EX. 7 |
|---|---|---|---|---|---|---|---|---|
| Glass powder | 1 (softening point: 460° C.; average particle diameter: 2 μm) | 60 | | | 60 | 60 | 60 | 60 |
| | 2 (softening point: 490° C.; average particle diameter: 1 μm) | | 30 | | | | | |
| | 3 (softening point: 500° C.; average particle diameter: 2 μm) | | | 80 | | | | |
| Inorganic pigment | Cobalt oxide 1 (average particle diameter: 70 nm) | 35 | 65 | 15 | 40 | | | 35 |
| | Cobalt oxide 2 (average particle diameter: 100 nm) | | | | | 35 | | |
| | Cobalt oxide 3 (average particle diameter: 50 nm) | | | | | | 35 | |
| Conductive powder | Nickel powder 1 (average particle diameter: 2 μm) | 5 | 5 | 5 | | 5 | 5 | |
| | Silver powder (average particle diameter: 2 μm) | | | | | | | 5 |
| Evaluation | Screen printability of paste | A | A | A | A | A | A | A |
| | Pattern formability of paste | A | A | A | A | A | A | A |
| | Sinterability at 580° C. | A | A | A | A | A | A | A |
| | Blackness after burning at 580° C. | A | A | A | A | B | B | B |
| | Color after burning at 580° C. | Black | Black | Black | Black | Black | Brown | Black |
| | Conductive property | A | A | A | B | A | A | A |

*Ex: Example

TABLE 2

(parts by weight)

| | | *EX. 8 | EX. 9 | EX. 10 | EX. 11 | EX. 12 | EX. 13 | EX. 14 | EX. 15 | **C.E. 1 |
|---|---|---|---|---|---|---|---|---|---|---|
| Glass powder | 1 (softening point: 460° C.; average particle diameter: 2 μm) | 90 | 15 | | | | | 60 | 60 | 60 |
| | 4 (softening point: 390° C.; average particle diameter: 2 μm) | | | 60 | | | | | | |
| | 5 (softening point: 530° C.; average particle diameter: 2 μm) | | | | 60 | | | | | |
| | 6 (softening point: 460° C.; average particle diameter: 0.3 μm) | | | | | 60 | | | | |
| | 7 (softening point: 460° C.; average particle diameter: 5 μm) | | | | | | 60 | | | |
| Inorganic pigment | Cobalt oxide 1 (average particle diameter: 70 nm) | 5 | 80 | 35 | 35 | 35 | 35 | 35 | 35 | |
| | Carbon black, average particle diameter: 30 nm | | | | | | | | | 35 |
| Conductive powder | Nickel powder 1 (average particle diameter: 2 μm) | 5 | 5 | 5 | 5 | 5 | 5 | | | 5 |
| | Nickel powder 2 (average particle diameter: 0.05 μm) | | | | | | | 5 | | |
| | Nickel powder 3 (average particle diameter: 5 μm) | | | | | | | | 5 | |
| Evaluation | Screen printability of paste | A | B | A | A | C | B | C | B | A |
| | Pattern formability of paste | A | B | A | A | B | C | B | C | A |
| | Sinterability at 580° C. | A | C | C | C | A | A | A | A | A |
| | Blackness after burning at 580° C. | C | B | B | B | A | A | A | A | D |

*EX: Example
**C.E.: Comparative Example

Examples 1 to 3 had superior pattern formability, blackness, color, and conductive property. The conductive property of Example 4 was lower than that of Examples 1 to 3 since no conductive powder was contained in Example 4. Example 5, which contains a cobalt oxide having a relatively large average particle diameter, had a degree of blackness lower than that of Examples 1 to 4. Example 6 had a degree of blackness lower than that of Examples 1 to 4 and was brown. Example 7 exhibited a degree of blackness lower than that of Examples 1 to 4 since the luster of silver affects the degree of blackness more than the luster of nickel.

Example 8, which had a high cobalt oxide content, exhibited a relatively low degree of blackness. The black layer of Example 9, which had a high cobalt oxide content, exhibited a relatively low sinterability. In Example 10, the glass powder having a low softening point started to soften before all organic components in the photosensitive black paste were decomposed and evaporated. Since some organic components became enclosed in the molten glass and remained in the black layer, the sinterability of the black layer was relatively low. In Example 11, which used the glass powder having a high softening point, the sinterability of the black layer containing the cobalt oxide and the conductive powder was relatively low. In Examples 12 and 14, the screen printability of the paste was relatively poor due to the small particle size of the glass powder and the conductive powder. In Examples 13 and 15, the flatness of the black layer and the pattern formability of the paste were relatively poor due to the large particle size of the glass powder and the conductive powder. In Comparative Example 1, carbon black, which is a widely used black pigment, was used instead of a metal oxide inorganic pigment. The carbon black decomposed due to burning and hardly remained in the black layer, thereby decreasing the degree of blackness.

INDUSTRIAL APPLICABILITY

The invention provides black paste containing a cobalt oxide; therefore the black paste can prepare at low cost a black layer that exhibits a high degree of blackness after burning. The invention also provides a plasma display panel showing excellent display contrast at low cost, since the plasma display panel has a black layer exhibiting a high degree of blackness due to the cobalt oxide. And a method for fabricating a plasma display panel in the invention can easily form a black layer that has highly precise patterning and a high degree of blackness after burning at low cost by using a photosensitive black paste comprising a cobalt oxide.

What is claimed is:

1. A plasma display panel comprising a front panel and a rear panel, the front panel comprising a black layer and a first metal electrode on the black layer, the rear panel comprising a second electrode,
    wherein the black layer comprises an inorganic powder containing 10 to 70 percent by weight of a cobalt oxide and a glass powder, the black layer further comprising a conductive powder, and
    wherein the cobalt oxide has an average particle diameter of 10 to 100 nm.

2. The plasma display panel of claim 1, wherein the conductive powder has a particle diameter of 0.05 to 5 μm.

3. The plasma display panel of claim 1, wherein the conductive powder is 1-5 percent by weight of the total content of the inorganic powder.

* * * * *